US008065208B1

(12) United States Patent
Abrahams et al.

(10) Patent No.: US 8,065,208 B1
(45) Date of Patent: Nov. 22, 2011

(54) GUARANTEE CERTIFICATES (75) Inventors: Steven W. Abrahams, McLean, VA (US); Henry J. Cassidy, Arlington, VA (US)

(73) Assignee: Federal Home Loan Mortgage Corp., McLean, VA (US)

(*) Notice: Subject to any disclaimer, the term of this patent is extended or adjusted under 35 U.S.C. 154(b) by 1186 days.

(21) Appl. No.: 11/350,872

(22) Filed: Feb. 10, 2006

Related U.S. Application Data (62) Division of application No. 09/602,254, filed on Jun. 23, 2000, now Pat. No. 7,028,007.

(60) Provisional application No. 60/151,071, filed on Aug. 27, 1999.

(51) Int. Cl.
*G06Q 40/00* (2006.01)
(52) U.S. Cl. ......... 705/35; 705/36 R; 705/36 T; 705/37; 705/38
(58) Field of Classification Search .......... 705/35–36 R, 705/35–38
See application file for complete search history.

(56) References Cited

U.S. PATENT DOCUMENTS

| | | | | |
|---|---|---|---|---|
| 5,523,942 A | * | 6/1996 | Tyler et al. ........................ 705/4 |
| 5,832,461 A | * | 11/1998 | Leon et al. ...................... 705/38 |
| 5,930,775 A | * | 7/1999 | McCauley et al. ........... 705/36 R |
| 5,946,667 A | * | 8/1999 | Tull et al. .................... 705/36 R |
| 5,950,175 A | * | 9/1999 | Austin ........................ 705/36 R |
| 5,966,700 A | | 10/1999 | Gould et al. |
| 5,983,206 A | * | 11/1999 | Oppenheimer ................. 705/38 |
| 5,987,435 A | * | 11/1999 | Weiss et al. ................. 705/36 R |
| 6,067,533 A | * | 5/2000 | McCauley et al. .............. 705/38 |
| 6,070,151 A | | 5/2000 | Frankel |
| 6,078,903 A | * | 6/2000 | Kealhofer ................... 705/36 R |
| 6,088,685 A | | 7/2000 | Kiron et al. |
| 6,092,056 A | * | 7/2000 | Tull et al. .................... 705/36 R |
| 6,167,384 A | | 12/2000 | Graff |
| 6,178,406 B1 | * | 1/2001 | Cheetham et al. ............... 705/10 |

(Continued)

FOREIGN PATENT DOCUMENTS

WO    WO 94/23528    3/1994

(Continued)

OTHER PUBLICATIONS

"Finance and the Family (in the News): Quicker Way Home/Abbey National to Give Mortgage Guarantee Certificates," Financial Times Section E (Jan. 25, 1986).

(Continued)

*Primary Examiner* — Narayanswamy Subramanian
(74) *Attorney, Agent, or Firm* — Finnegan, Henderson, Farabow, Garrett & Dunner, LLP (57) ABSTRACT

Methods and systems are provided for issuing a new type of security, referred to herein as a "Guarantee Certificate," which offers payments to a holder contingent upon the occurrence of specified risk-related events that would typically trigger an insurance or guaranty payment. Guarantee Certificates offer a mechanism for separating certain payment rights associated with a pool of assets (which may or may not be securitized) from the remaining payment rights associated with the pool, such that the payment rights form separate, transferable financial instruments. These instruments evidence an obligation of a mortgage insurer or a securities guarantor to make payments triggered by certain default-related events involving a corresponding (in the case of a mortgage insurer) or an underlying (in the case of a securities guarantor) mortgage loan or loans. A data processing system creates and maintains information corresponding to the Guarantee Certificates. A Guarantee Certificate may be tradable by the holder.

22 Claims, 7 Drawing Sheets

U.S. PATENT DOCUMENTS

| | | | | |
|---|---|---|---|---|
| 6,192,347 B1* | 2/2001 | Graff | | 705/36 R |
| 6,208,978 B1* | 3/2001 | Walker et al. | | 705/38 |
| 6,233,566 B1 | 5/2001 | Levine et al. | | |
| 6,249,775 B1 | 6/2001 | Freeman et al. | | |
| 6,330,541 B1 | 12/2001 | Meyer et al. | | |
| 6,360,210 B1 | 3/2002 | Wallman | | |
| 6,381,585 B1 | 4/2002 | Maples et al. | | |
| 6,970,836 B1* | 11/2005 | Paltenghe et al. | | 705/18 |
| 7,028,007 B1* | 4/2006 | Abrahams et al. | | 705/38 |
| 7,099,843 B1* | 8/2006 | Cassidy et al. | | 705/38 |
| 7,792,742 B1* | 9/2010 | Thomas et al. | | 705/38 |
| 7,797,214 B2* | 9/2010 | Rosen et al. | | 705/36 R |
| 7,797,217 B2* | 9/2010 | Rosen et al. | | 705/36 R |
| 7,904,383 B2* | 3/2011 | Livermore et al. | | 705/38 |
| 2001/0025264 A1 | 9/2001 | Deaddio et al. | | |
| 2002/0019789 A1 | 2/2002 | Ginsberg | | |
| 2002/0035530 A1* | 3/2002 | Ervolini et al. | | 705/36 |
| 2004/0054621 A1* | 3/2004 | Bretvin | | 705/38 |
| 2005/0216384 A1* | 9/2005 | Partlow et al. | | 705/35 |
| 2006/0143099 A1* | 6/2006 | Partlow et al. | | 705/35 |
| 2006/0271462 A1* | 11/2006 | Harmon | | 705/35 |
| 2007/0106591 A1* | 5/2007 | Waisbren | | 705/36 R |
| 2008/0126267 A1* | 5/2008 | Rosen et al. | | 705/36 R |
| 2008/0249809 A1* | 10/2008 | Rosen et al. | | 705/4 |
| 2010/0153254 A1* | 6/2010 | Shalen | | 705/37 |
| 2010/0153263 A1* | 6/2010 | Keadle et al. | | 705/39 |
| 2010/0250432 A1* | 9/2010 | Obegi | | 705/39 |
| 2010/0293092 A1* | 11/2010 | Voltz et al. | | 705/39 |
| 2011/0125669 A1* | 5/2011 | Smith et al. | | 705/36 R |
| 2011/0131066 A1* | 6/2011 | Butcher et al. | | 705/4 |

FOREIGN PATENT DOCUMENTS

| | | |
|---|---|---|
| WO | WO 99/46710 | 3/1998 |
| WO | WO 2005/059781 A1 | 6/2005 |

OTHER PUBLICATIONS

Padgette, "Performance Reporting: The Basics and Beyond: Part I," Journal of Financial Planning, Jul. 1995, pp. 110-118.

Anonymous, "Newly Launched Russell/Mellon Analytical Services Combines Global Client Base to Serve more than $2 Trillion in Assets," Newswire, Jan. 20, 1999, p. 1488.

Anonymous, "Benchmarks for Evaluating Performance," Association Management, Jun. 1998, pp. 64.

Ghani, "Plan for Bank-Capital Rules Spurs Doubts," Jun. 7, 1999, Asian Wall Street Journal, p. 2 (2 pages).

Seiberg, "Risk-Indexed Capital Rules Proposed by Global Panel," American Banker, vol. 164, Issue 106, Jun. 4, 1999, p. 1 (3 pages).

Office Action dated Dec. 31, 2008, for U.S. Appl. No. 11/350,792, filed Feb. 10, 2006, (10 pages).

Office Action dated Dec. 28, 2007, for U.S. Appl. No. 10/813,260, filed Mar. 31, 2004, (14 pages).

Office Action dated Aug. 6, 2008, for U.S. Appl. No. 10/813,260, filed Mar. 31, 2004, (11 pages).

Office Action dated Feb. 12, 2009, for U.S. Appl. No. 10/813,260, filed Mar. 31, 2004, (8 pages).

* cited by examiner

GUARANTEE CERTIFICATES

RELATED APPLICATION DATA

The present application is a division of and claims benefit of application Ser. No. 09/602,254, filed Jun. 23, 2000, now U.S. Pat. No. 7,028,007 which is related to and claims the priority of U.S. Provisional Application No. 60/151,071, filed Aug. 27, 1999, in the names of Steven W. Abrahams and Henry J. Cassidy, and entitled Guarantee Certificates, all of which are incorporated herein by reference.

BACKGROUND OF THE INVENTION

A. Field of the Invention

The present invention generally relates to financial instruments, and systems and methods for issuing and administering the same. More particularly, the invention relates to systems and methods for separating certain payment rights associated with a pool of assets (which may or may not be securitized) from the remaining payment rights associated with the pool, such that the separated payment obligations form separately transferable financial instruments. Guarantee Certificates evidence an obligation of a mortgage insurer or a securities guarantor to make payments triggered by certain events, typically, default-related events involving a corresponding (in the case of a mortgage insurer) or an underlying (in the case of a securities guarantor) mortgage loan or loans.

B. Description of the Related Art

Mortgage insurers regularly write contracts that cover the actual or estimated losses associated with the delinquency and default of mortgage loans. In the absence of mortgage insurance, when a mortgage loan becomes delinquent, the holder of the note typically loses interest payments it would otherwise have received and also may incur expenses associated with foreclosure and liquidation of the mortgaged property. The proceeds from liquidation also may fall short of the amount of principal due to the note holder. If, in lieu of a foreclosure, the mortgage loan is renegotiated in connection with the default, the note holder also may experience losses associated with the workout of the loan. In any case, mortgage insurance would reimburse the note holder for all or part of the foregone interest, expenses and liquidation shortfall.

In the case of loans that have been securitized, i.e., turned into a security, mortgage-backed security investors may turn to bond insurers or government-sponsored enterprises to mitigate losses arising from default of the underlying mortgage loans. These parties typically guarantee the timely payment of loan principal, interest or both. In exchange for a fee, these guarantors absorb all or a portion of the losses that would otherwise be associated with the guaranteed securities. When a securitized mortgage loan experiences a payment default, the guarantor typically compensates the security holder for the difference between scheduled principal and interest payments and the aggregate net amount which is actually realized from a workout or liquidation. As is the case with payments from mortgage insurers, this "make-whole" payment is passed along to a security holder undistinguished from the payment of interest and return of loan principal through normal means, such as amortization or prepayment.

In addition, the guarantor generally ensures that these payments are made to the securities investor at the originally scheduled time, so that the investor does not bear the risk or expense of delays inherent in the loan workout or foreclosure/liquidation process. The existence of insurance for a mortgage loan, or of a guarantee for a mortgage-backed security, is generally established at the beginning of the life of the loan or security in question. A contract between the insurer/guarantor and the investor or trustee sets the terms of the arrangement. A feature of this contract is that the payment obligation of the insurer or guarantor always runs to the owner of the insured or guaranteed asset so that the asset and the insurance cannot be decoupled, even if the value of the arrangement to the owner changes. This feature makes the arrangement illiquid and potentially less valuable.

SUMMARY OF THE INVENTION

The present invention includes the use of a financial instrument (referred to herein as a "Guarantee Certificate") that takes the payment obligations of the mortgage insurers and securities guarantors and places them into a separate, transferable financial instrument. Guarantee Certificates of the present invention pay an investor(s) based on specified triggering events associated with a loan pool. Triggering events can be defined by loan delinquency, foreclosure on a property backing an insured or guaranteed mortgage, acquisition of a deed in lieu of foreclosure of the collateral, or liquidation of a property formerly backing an insured or guaranteed mortgage. The Guarantee Certificate may offer payment based on a fixed percentage of the defaulted loan principal, payment of actual or estimated losses, or a formula that combines these or other elements or a multiple of the same. The loan pool for a given Guarantee Certificate could include one or more loans of any type or origin.

Issuers can create Guarantee Certificates either by restructuring the cash flows from existing insurance or guarantee arrangements, or by issuing the securities de novo. In a restructuring, the issuer pools loans or securities already insured or guaranteed and places them in a trust. The trustee identifies and segregates the cash flows paid to satisfy insurance or guarantee claims, and the trust issues Guarantee Certificates entitled to receive a specified schedule of the insurance or guarantee payments. The payments can be a straight dollar-for-dollar pass-through of the insurance or guaranty payments, or can be determined by a formula based on the payments. In a de novo issuance, the issuer specifies a set of loans (which may or may not be securitized) as a Reference Pool and issues Guarantee Certificates entitled to receive formula-based cash flows triggered by specified events or conditions in the Reference Pool. The Reference pool may be static or dynamic.

BRIEF DESCRIPTION OF THE DRAWINGS

The accompanying drawings, which are incorporated in and constitute a part of this specification, illustrate the various features and aspects of the invention and, together with the description, explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

Overview

Systems and methods consistent with the present invention process information corresponding to Guarantee Certificates, which are financial instruments that evidence the obligation of an insurer or a guarantor to make payments that are triggered by certain events. The triggering event creates the payment obligation.

In one preferred embodiment, a Guarantee Certificate evidences the obligation of a mortgage insurer or a securities guarantor to make payments that are triggered by events, typically, default-related events, involving a related (in the case of a mortgage insurer) or an underlying (in the case of a securities guarantor) mortgage loan or loans. For example, the instrument might evidence the obligation of a mortgage insurer or securities guarantor to make payments to the Guarantee Certificate holder based on the payment default of a borrower or borrowers with respect to the group (the "Reference Pool") of related or underlying mortgage loans (the "Reference Loans" or "Reference Pool elements") associated with the Guarantee Certificate.

A data processing system tracks the status of the Reference Loans (elements) in a series of Reference Pools uniquely associated with each Guarantee Certificate. When the data processing system identifies a default under a Reference Loan or another payment-triggering event, it calculates the amount payable to the appropriate Guarantee Certificate holder.

A unique feature of Guarantee Certificates is that they are decoupled from, and therefore, in one preferred embodiment, may be bought, sold, and conveyed independently of the Reference Loans and/or mortgage-backed securities representing an interest in the Reference Loans that are the source of the payment-triggering events. In other words, Guarantee Certificates can be made tradable, if the issuer so desires.

Data Processing System Architecture

The present invention may be implemented by computers or workstations organized in a distributed processing system architecture, with any suitable combination of software, hardware, and/or firmware.

Figure 1:
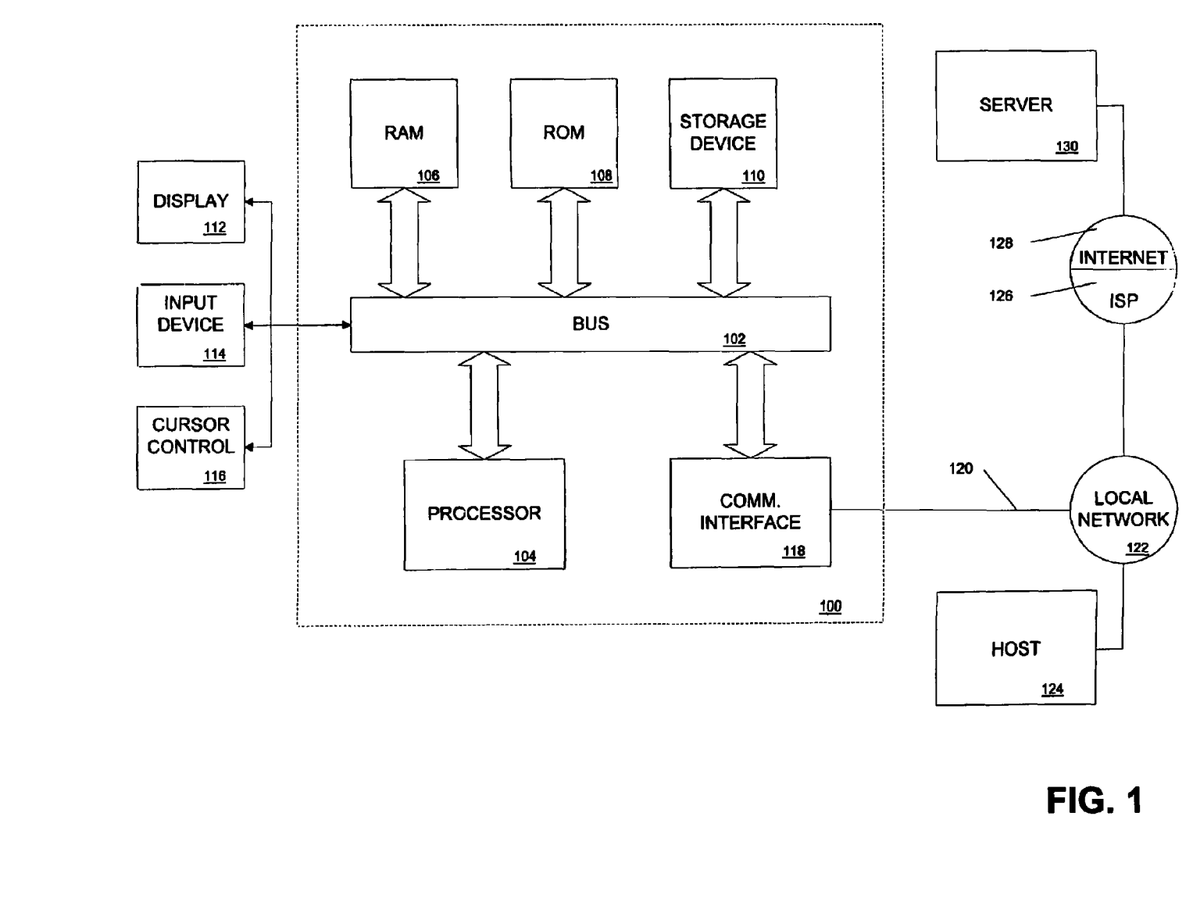
FIG. 1 is a schematic block diagram of a data processing system architecture suitable for use with the present invention.

FIG. 1 is a block diagram that illustrates a data processing system 100 in which methods and systems consistent with the present invention may be implemented. System 100 includes a bus 102 or other communication mechanism for communicating information, and a processor 104 coupled with bus 102 for processing information. System 100 also includes a main memory, such as a random access memory (RAM) 106 or other dynamic storage device, coupled to bus 102 for storing information and instructions to be executed by processor 104. RAM 106 also may be used for storing temporary variables or other intermediate information during execution of instructions by processor 104. System 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

System 100 may be coupled via bus 102 to a display 112, such as a cathode ray tube, for displaying information to a user. An input device 114, including alphanumeric and other keys, is coupled to bus 102 for communicating information and command selections to processor 104. Another type of user input device is a cursor control 116, such as a mouse, a trackball or cursor direction keys, for communicating direction information and command selections to processor 104 and for controlling cursor movement on display 112. This input device typically has two degrees of freedom in two axes, a first axis (e.g., x) and a second axis (e.g., y), that allow the device to specify positions in a plane.

The present invention is related to the use of system 100 for issuing and maintaining Guarantee Certificates. These operations may involve accessing information from remote platforms and transmitting information to remote platforms. According to one implementation of the invention, information from remote platforms is provided to system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media, includes coaxial cables, copper wire and fiber optics, including the wires that comprise bus 102. Transmission media can also take the form of radio frequency, acoustic or light waves, such as those generated during radio-wave and infra-red data communications.

Common forms of computer-readable media include, for example, a floppy disk, a flexible disk, a hard disk, a magnetic tape, any other magnetic medium, a CD-ROM, any other optical medium; a punch card, a paper tape, any other physical medium with patterns of holes, a RAM, a PROM, an EPROM, a FLASH-EPROM, any other memory chip or cartridge, a carrier wave as described hereinafter, or any other medium from which a computer processor can read.

Various forms of computer readable media may be involved in carrying one or more sequences of one or more instructions and/or data to processor 104. For example, instructions may initially be carried on the magnetic disk of a remote computer. The remote computer can load the instructions into its dynamic memory and send the instructions over a telephone line using a modem. A communication interface 118 local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

As shown, system 100 includes communication interface 118 coupled to bus 102. Communication interface 118 provides a two-way data communication coupling to a network link 120 that is connected to a local network 122. For example, communication interface 118 may be an integrated services digital network (ISDN) card, or a modem to provide a data communication connection to a corresponding type of cable or telephone line, or an infrared-transmitting modem directly connected to local network 120 and connected via an infrared detector to bus 102, as discussed above. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry analog or digital data streams representing various types of information.

Network link 120 typically provides data communication through one or more networks to other data devices. For example, network link 120 may provide a connection through local network 122 to a host computer 124 and/or to data equipment operated by an Internet Service Provider (ISP) 126. ISP 126 in turn provides data communication services through the Internet 128. Local network 122 and Internet 128 both use electric, electromagnetic or optical signals that carry digital data streams. The signals through the various networks and the signals on network link 120 and through communication interface 118, which carry the digital data to and from system 100, are exemplary forms of carrier waves transporting the information.

System 100 can send messages and receive data, including program code, through the network(s), network link 120 and communication interface 118. In the Internet example, a server 130 might transmit a requested code for an application program through Internet 128, ISP 126, local network 122, network link 120, and communication interface 118. In accordance with the present invention, one such downloaded application provides a bridge between two remote information sources, as described herein. The received code may be executed by processor 104 as it is received, and/or stored in storage device 110, or other non-volatile storage for later execution. In this manner, system 100 may obtain application code in the form of a carrier wave.

Although system 100 is shown in FIG. 1 as being connected to one server, 130, those skilled in the art will recognize that computer system 100 may establish connections to multiple servers on Internet 128. Each such server includes an Internet application such as an HTML- or XML-based application, which may provide information to computer system 100 upon request in a manner consistent with the present invention.

The system architecture just described is exemplary. One of ordinary skill in the art could easily substitute, replace, add, or eliminate various components without departing from the principles of the present invention. For example, the various networks and communication paths described could be implemented using DSL, cable, wireless, and/or Internet technology in place of the technology described.

Guarantee Certificates

In one embodiment, steps according to the present invention are embodied in machine-executable software instructions, and components of the present invention are carried out in a processing system by a processor executing the instructions. In other embodiments, hardwired circuitry may be used in place of, or in combination with, software instructions to implement the present invention.

Figure 2:
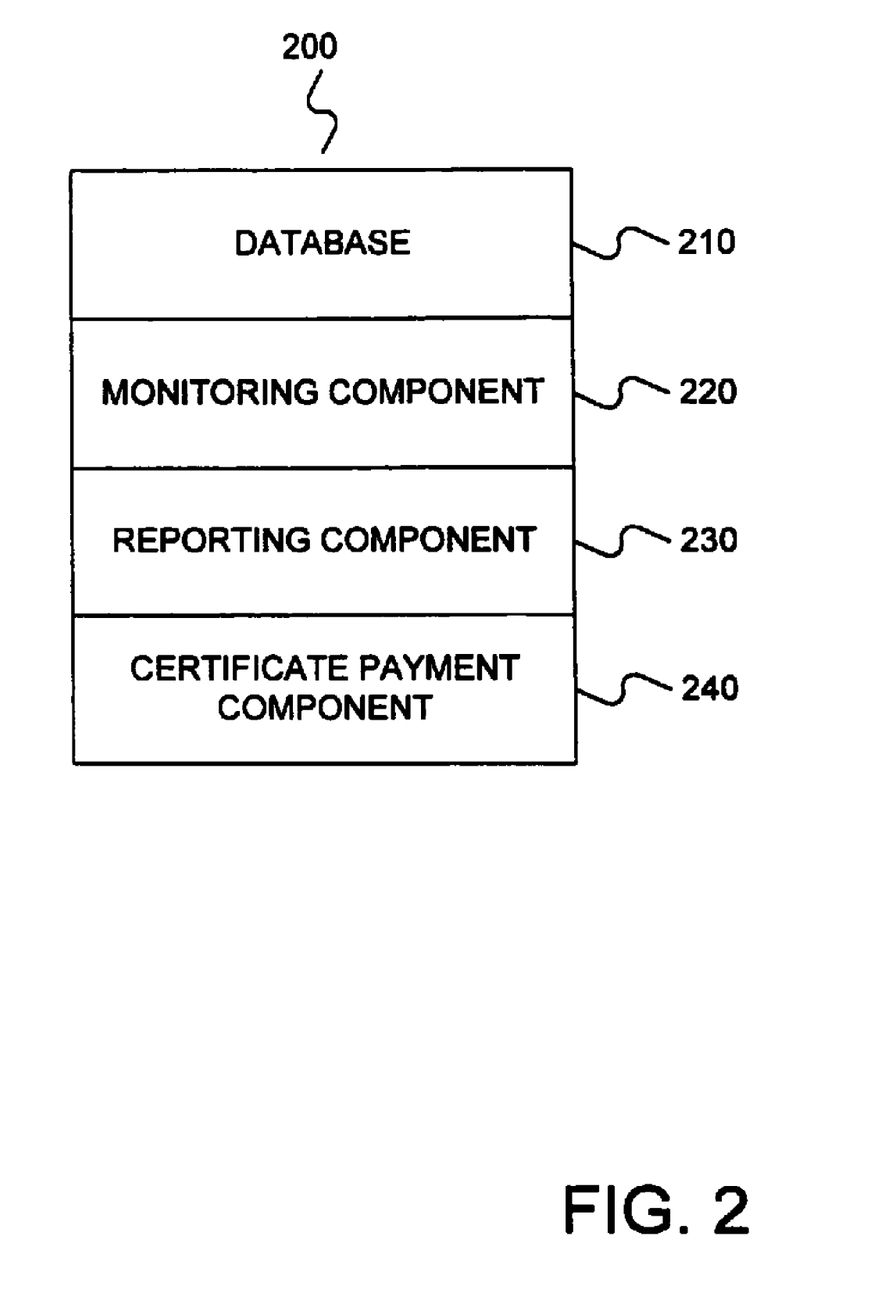
FIG. 2 is a block diagram of the components of a system for managing Guarantee Certificates.

In one embodiment, system 100 uses four software components to support Guarantee Certificates in a manner consistent with the present invention. As shown in FIG. 2, the components 200 include a database management system 210, a monitoring component 220, a reporting component 230, and a certificate payment component 240.

1) Database Management System

Database management system ("database") 210 holds identifying information, including the initial attributes, of each loan or other element of the Reference Pool that is the source of the "guaranteed" risk, including the identity of the Reference Pool or Reference Pools to which each element belongs. For example, in the case of a Reference Pool of mortgages, database 210 holds information and attributes for mortgage loans in the pool. Database 210 also holds information on the ongoing status or performance of each element in the Reference Pool. In the case of mortgage risk, ongoing information could include coupon history, principal balance history, payment history, delinquency history, borrower's credit history, and any other information on a variable aspect of a given loan. Database 210 may also hold information concerning a Guarantee Certificate itself, such as the elements in the certificate's Reference Pool, the current holder or holders of the certificate, and the certificate's conveyance history. Database 210 has the ability to accept either manual or electronic input and to deliver either printed or electronic output.

Database 210 uses a query language (such as standard query language "SQL") to access stored information. The query language allows the user to extract data either using a keyboard or using another program without knowing the detailed structure of the database. For example, the user might be able to request, using a query language query, a payment history for all 30-year loans originated in 1993 without knowing precisely where this information is located in database 210. In addition, database 210 includes methods of checking for possible data input errors and/or data inconsistencies and for reporting and/or correcting those errors and inconsistencies.

2) Monitoring Component

Figure 3:
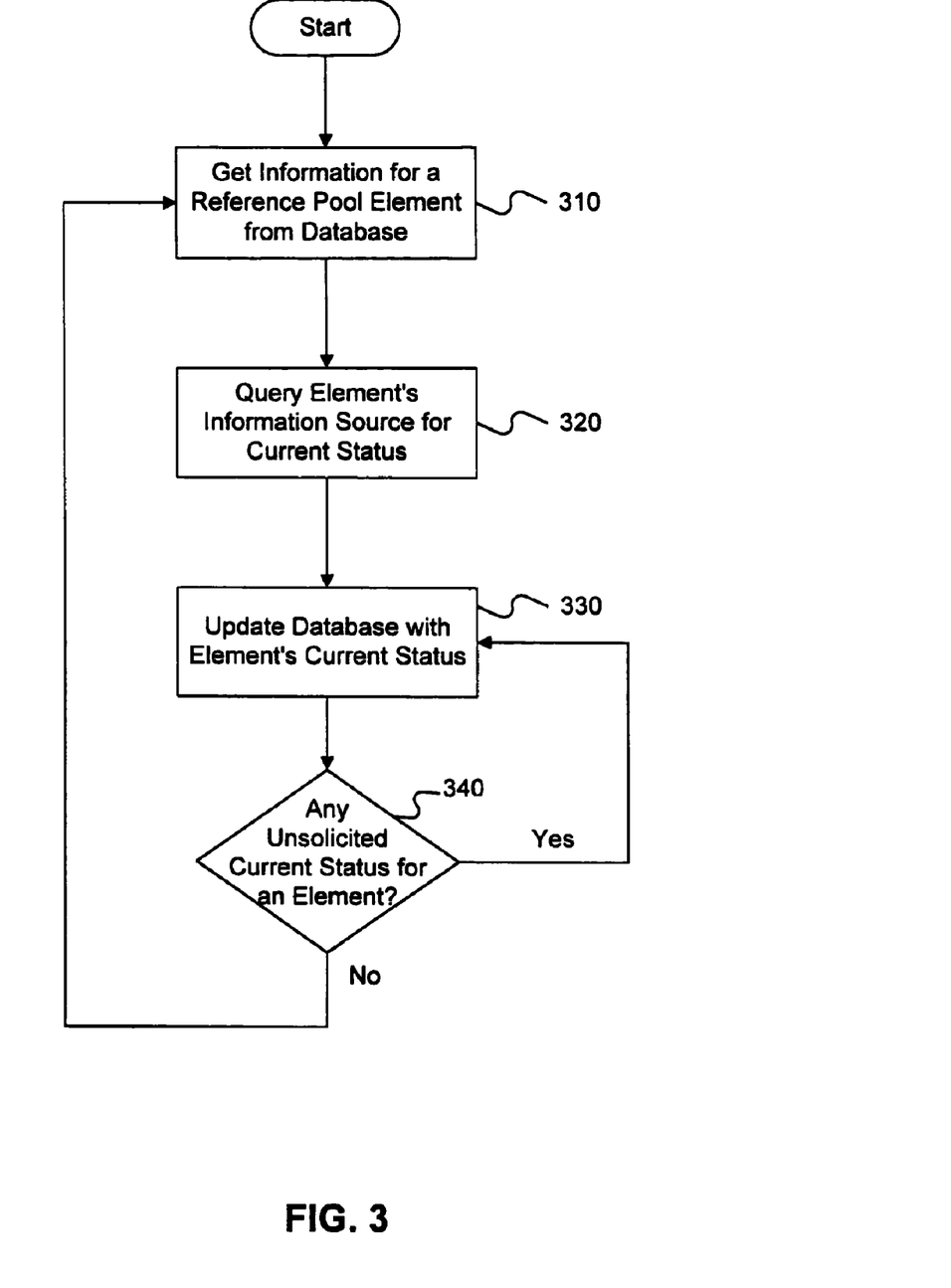
FIG. 3 is an exemplary flowchart of the steps performed by the monitoring component of a Guarantee Certificate system, consistent with the principles of the present invention.

A monitoring component 220 queries and takes input from agents that monitor the ongoing status or performance of each element in the Reference Pool, with particular emphasis on status changes that constitute triggering events for purposes of the payment function. FIG. 3 is an exemplary flowchart of the steps performed by a monitoring component of a Guarantee Certificate system, consistent with the principles of the present invention.

As shown in FIG. 3, the first step of the process gets information concerning a Reference Pool element from database 210 (step 310). The information includes the identity of a status information source for the element. The status information source is anything that can supply current status regarding the element, such as a person, a computer system such as host 124, or a database hosted on a computer system such as server 130. In the case of a Reference Pool of mortgages, the status information source is typically a mortgage servicer or other person who monitors loan status or performance.

Next, monitoring component 220 queries the Reference Pool element's information source for the current status of the element (step 320). In the case of a human information source, querying typically involves generating a written message requesting information, such as a letter or email message. In the case of an automated information source, querying typically involves an electronic service request sent across network 122, or an electronic query to a database.

When an element's current status information is received in response to the query, monitoring component 220 records the information in database 210 (step 330). For a non-electronic response, such as a letter from a person, recording the current status information in database 210 typically involves manually entering the information using input device 114. For an automated response, such as the electronic results of a query to a remote database, recording typically involves automatically saving the information in database 210.

In step 340, if current status information for a Reference Pool element arrives unsolicited (i.e., not in response to a monitoring component query), then monitoring component 220 updates database 210 with the current status (step 330). If there is no unsolicited current status information to process, then the monitoring component process returns to step 310 to process another Reference Pool element.

3) Reporting Component

Reporting component 230 allows ad hoc or standard queries to database 210 and generates electronic or printed reports. In the case of a Reference Pool of mortgages, this component queries database 210 and reports on payment status, delinquent status or any other attribute either for individual loans or in the aggregate. Reporting component 230 also provides information about one or more Guarantee Certificates, including descriptive information and the history of certificate holder payments made.

4) Certificate Payment Component

Figure 4:
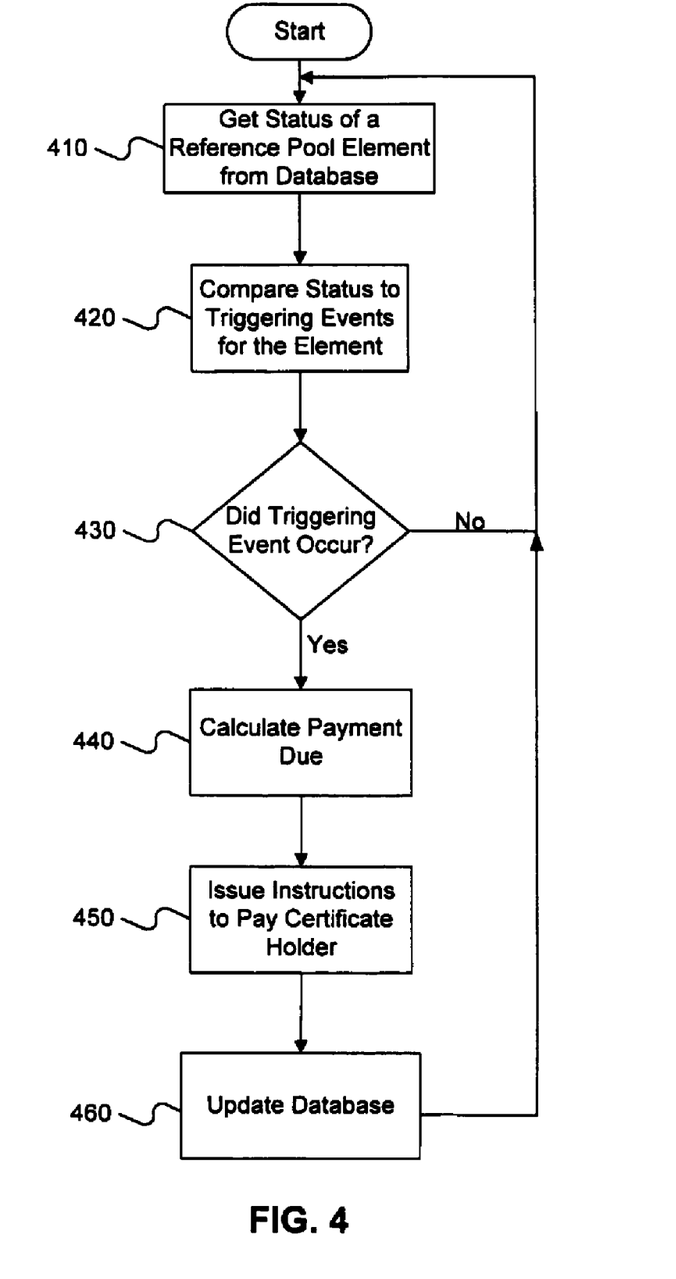
FIG. 4 is a flowchart of the steps performed by the certificate payment component of a Guarantee Certificate system, consistent with the principles of the present invention.

Certificate payment component 240 stores the definition of events that trigger payments to Guarantee Certificate holders, identifies when triggering events occur, calculates any payments due, and issues instructions to pay Certificate holders. FIG. 4 is an exemplary flowchart of the steps performed by the certificate payment component of a Guarantee Certificate system, consistent with the principles of the present invention.

As shown in FIG. 4, the first step of the process gets the status information of a Reference Pool element from database 210 (step 410). In the case of a Reference Pool of mortgages, payment component 240 keeps a list of the loans in database 210 belonging to the pool and gets the status information of each of them.

Next, payment component 240 compares the status information to the triggering event or events for the Reference Pool element (step 420). Payment component 240 keeps a definition of each triggering event for a Guarantee Certificate, such as reaching the status of a specified number of days delinquent, loan foreclosure, property liquidation or another event monitored or recorded by the system. If the triggering event did not occur (step 430; No), then payment component 240 returns to step 410 to process another Reference Pool element. If the triggering event occurred (step 430, Yes), then the process moves to step 440.

In step 440, payment component 240 calculates the payment due for the triggering event. The calculation can involve any mathematical formula related or unrelated to any variable measured by the system. For example, the payment can be a straight dollar-for-dollar pass-through of the insurance or guarantee payment, or a fixed percentage of the insurance or guarantee payment, or some other amount based on a formula. Next, payment component 240 issues instructions to pay the Certificate holder or holders (step 450). This typically involves sending an electronic or printed notice to the paying agent for the Guarantee Certificate in question.

Payment component 240 then updates database 210 regarding the payment made to the Guarantee Certificate holder (step 460), and returns to step 410 to process another Reference Pool element.

One of ordinary skill in the art will recognize that many modifications can be made to the components and steps described without departing from the principles of the present invention. For example, monitoring component 220 and reporting component 230 could be combined into a single component that performs the functions of both.

Issuing Process

Figure 5:
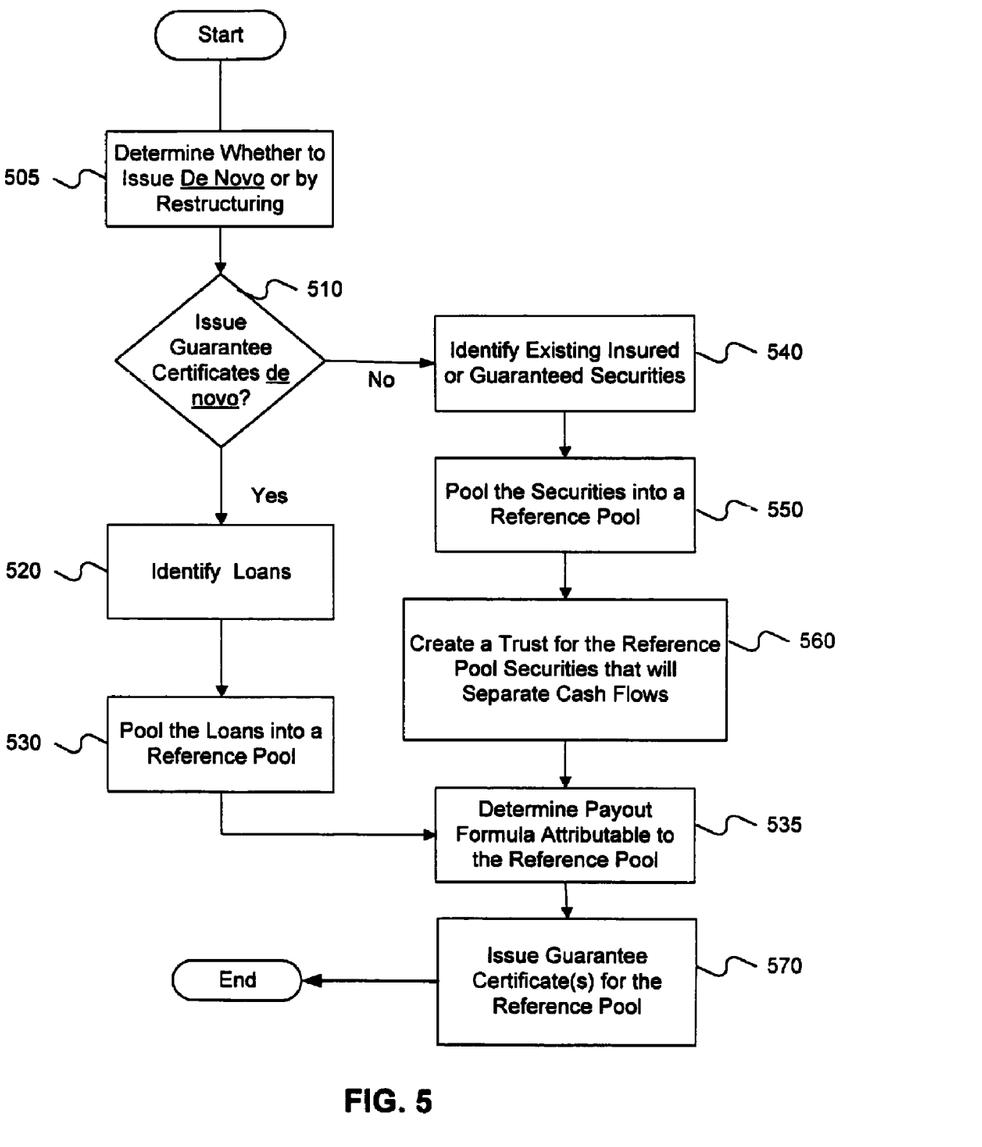
FIG. 5 is a flowchart of steps for issuing a Guarantee Certificate, consistent with the principles of the present invention.

Issuers can create Guarantee Certificates either by restructuring the cash flows from existing insurance or guarantee arrangements, or by issuing the certificates de novo. FIG. 5 is an exemplary flowchart of the steps for issuing a Guarantee Certificate, consistent with the principles of the present invention.

As shown in FIG. 5, the issuer first determines whether to issue a Guarantee Certificate de novo, or by restructuring existing financial obligations (step 505). If, at step 510, the issuer decides to issue de novo Guarantee Certificates, the issuer identifies or specifies a set of loans (which may or may not be securitized) (step 520), and pools the loans into a Reference Pool (step 530).

The issuer then determines a payout formula attributable to the Reference Pool (step 535). For de novo Guarantee Certificates, the Reference Pool merely acts as an index and no cash flows attributable to the loans in the Pool are used to satisfy the de novo Guarantee Certificate payout formula obligation.

In one preferred embodiment, the issuer determines the payout formula by modeling the behavior of the Reference Pool with respect to a separate loan pool. For example, a de novo issuer of Guarantee Certificates for a pool of manufactured-housing loans may model the manufactured-housing loan Reference Pool off of a single-family-housing loan pool. Even if the issuer is not familiar with the performance of the manufactured-housing pool, by modeling it against the familiar single-family-housing pool, the issuer can determine a payout formula that reflects the differences between the two. For example, if the delinquency rate of manufactured-housing loans is twice that of single-family-housing loan, then the issuer makes the manufactured-housing loan pool Guarantee Certificate payout formula one-half of the formula used for a single-family housing loan pool.

In step 570, the issuer issues Guarantee Certificate(s) entitled to receive cash flows specified by the payout formula and triggered by specified events or conditions in the Reference Pool.

If the issuer decides not to issue de novo Guarantee Certificates (step 510), then the issuer can restructure existing financial obligations to issue Guarantee Certificates. For a restructuring issue, the issuer identifies existing loans and/or securities already insured or guaranteed (step 540) and pools the loans and/or securities into a Reference Pool (step 550). In contrast to de novo issuance, the cash flows used to satisfy any Guarantee Certificate obligation come from the securities in the Reference Pool.

In forming the Reference Pool, the issuer may choose loans or securities based upon the perceived risk associated with each, the potential make-whole payment associated with each, or other factors. Pooling involves forming the loans and/or securities into an identified group. The Reference Pool may be static or dynamic. With static Reference Pools, the loans are identified when the Reference Pool is created and cannot be changed. With dynamic pools, loans can be added or removed according to a pre-specified eligibility rule. For example, an eligibility rule might be loans purchased by a specified entity having specific characteristics such as loan size or type. Dynamic pools can be used to hedge an active portfolio by reducing the need to continually adjust the hedge as new loans are added to the portfolio.

Next, the issuer creates a trust to hold the Reference Pool loans or securities (step 560). The trust obligates the trustee to identify and segregate the cash flows paid to satisfy insurance or guarantee claims from the cash flows normally paid by the underlying loans or securities. Guarantee Certificates are then issued based on the trust created by the issuer. Each Guarantee Certificate is entitled to receive a specified schedule of the insurance or guarantee payments (step 570). The payments can be a straight dollar-for-dollar pass-through of the insurance or guaranty payments, or can be determined by a formula based on the payments.

When a Guarantee Certificate is issued, the term (time period) of a Guarantee Certificate may vary from the terms of the loans in the Reference Pool. The Guarantee Certificate period may be longer or shorter than the terms of the pool elements. For example, the Reference Pool may contain 30-year mortgages exclusively, yet the issuer may issue a Guarantee Certificate with a term or 10 years or with a term of 40 years.

Figure 6:
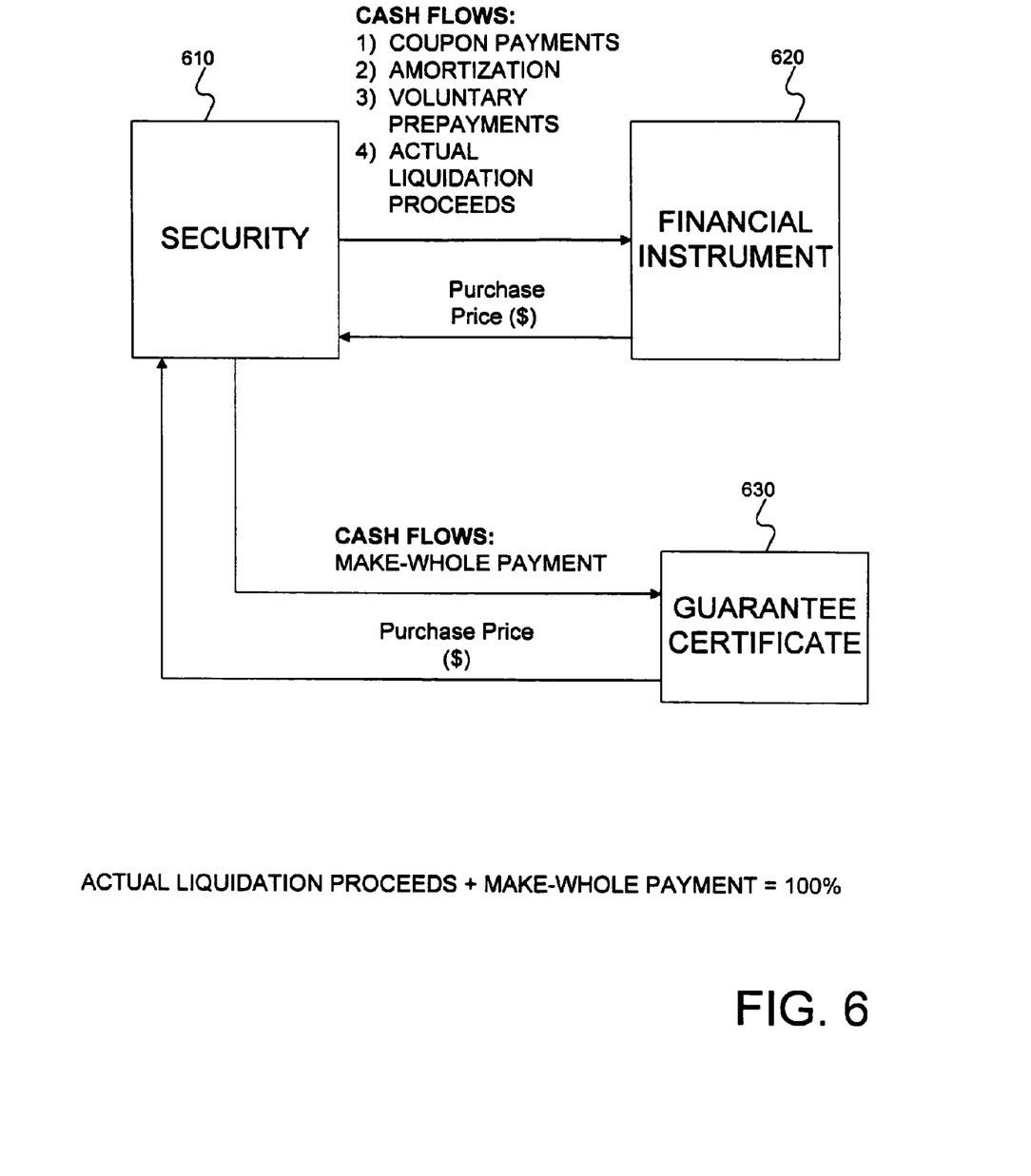
FIG. 6 is a block diagram illustrating the process of restructuring cash flows from existing guarantee arrangements to issue Guarantee Certificates, in accordance with the principles of the present invention.

FIG. 6 further illustrates one way in which cash flows from existing guarantee arrangements, such as insured loans, can be restructured to issue Guarantee Certificates in accordance with one aspect of the present invention. As shown in FIG. 6, security 610 represents a set of investments, for example, a Reference Pool of loans. Associated with security 610 is a traditional financial instrument 620 and a Guarantee Certificate 630. In exchange for the purchase price, the holder of financial instrument 620, which may be a bond or other instrument evidencing a guarantee obligation, receives all cash flows traditionally associated with the guarantee obligation. For example, in the case illustrated of a mortgage loan, the holder of financial instrument 620 receives payments in the forms of: all regular interest payments (shown as coupon payments), amortization benefits, voluntary prepayments, and the actual liquidation proceeds if the collateral underlying security 610 is sold. The holder of Guarantee Certificate 630, on the other hand, receives a cash flow in the form of a make-whole payment only if the collateral underlying security 610 is liquidated. A make-whole payment is the difference between the full value of security 610 and the actual liquidation proceeds. Thus, the full (100%) value of security 610 is equal to the combination of the make-whole payment and the actual liquidation proceeds. By dividing the cash flows of an existing security 610 as described, an issuer can create, issue, and manage a Guarantee Certificate 630.

It is important to note that, in this example, the buyer of Guarantee Certificate 630 pays security 610 holder for a contingent interest in the make-whole payment, not a certain interest. The make-whole payment of an insured mortgage loan, for example, is generated only if the underlying security for the loan (i.e., the real estate) is sold. Typically, real estate is liquidated only when a mortgage loan is in default. Thus, the holder of Guarantee Certificate 630 receives a make-whole payment only if the mortgage loan borrower defaults and the mortgage holder liquidates the underlying real estate. The make-whole payment also could be triggered by an event other than a real estate liquidation, such as, for example, a 30-day delinquency or foreclosure.

The purchase price sum paid to the issuer for the contingent interest of Guarantee Certificate 630 may be set at a value relative to the particular security, or it may be determined by auction. For example, a security with an extremely low likelihood of default may demand a very low amount for the corresponding Guarantee Certificate. If, however, there is a high likelihood of default, a buyer may be willing to pay a higher amount for the Guarantee Certificate. Whether or not the issuer has restricted or eliminated the buyer's ability to trade a Guarantee Certificate after issuance will also affect the initial price. After initial issuance, the price a subsequent buyer is willing to pay for a tradable Guarantee Certificate will be determined by various market factors, including the default history in the Reference Pool, and projections of the subsequent likelihood of default within the pool.

One skilled in the art will recognize that amounts of the cash flows and the types of triggering events can be varied without departing from the principles of the present invention. For example, instead of liquidation, the cash flows to the Guarantee Certificate holder could be triggered by a payment delinquency event, such as a 180-day payment delinquency, a foreclosure event, or the classification of a property as Real Estate Owned (REO). For another example, instead of the entire make-whole payment, the cash flows to the Guarantee Certificate holder could be structured to be a fraction of the make-whole payment.

Figure 7:
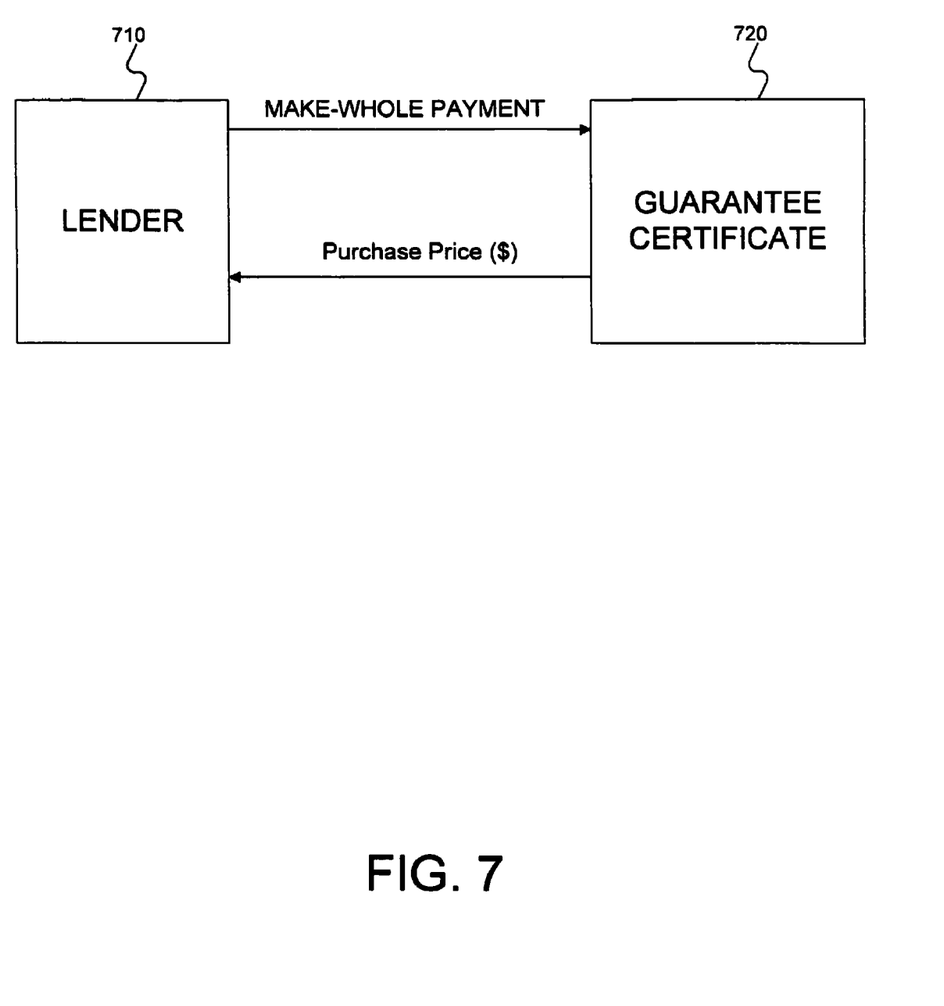
FIG. 7 is a block diagram illustrating the payment process associated with a de novo issuance of Guarantee Certificates, in accordance with the principles of the present invention.

FIG. 7 is a block diagram illustrating the payment process associated with an issuance of de novo Guarantee Certificates associated with a Reference Pool in accordance with the principles of the present invention. As shown in FIG. 7, a lender 710 issues a Guarantee Certificates 720, which is associated with a security or Reference Pool, to an entity in exchange for a sum of money. Guarantee Certificate 720 entitles the entity, or other holder in due course, to receive make-whole payments should, for example, the underlying property be sold. The make-whole payment is the difference between the full value of the security or pool and the actual liquidation proceeds. The make-whole payment also could be triggered by an event other than a real estate liquidation, such as, for example, a 30-day delinquency or foreclosure.

CONCLUSION

Guarantee Certificates of the present invention offer several benefits which are not available through other securities existing in the marketplace at this time:

First, Guarantee Certificates provide the first tradable guarantee against mortgage default. Tradability allows a holder of mortgage default risk to continually adjust the quality and cost of the insurance in place to offset the default risk. This characteristic of Guarantee Certificates adds significant efficiency to the market for taking on mortgage default risk, lowering its cost and broadening the number of investors. Further, this tradable guarantee can work either by offsetting the full or partial cash flows of another instrument or by offsetting its market value. Currently, mortgage insurers and securities guarantors only provide cash flow hedges for holders of mortgage default risk. To the extent a secondary trading market develops for Guarantee Certificates, these certificates would allow holders of default risk for the first time to put in place a market-value hedge. For example, as mortgage defaults in a Reference Pool rise, the market value of a Guarantee Certificate associated with the Reference Pool will rise too, allowing a certificate holder to liquidate all or part of the instrument to cover losses. Beneficiaries of a tradable guarantee to mortgage default risk would include holders of whole mortgage loans and holders of mortgage-related securities subject to loan default risk and could even include the issuer of the tradeable guarantee who uses it as a hedge on the risk of a separate group of mortgage loans or securities.

Second, Guarantee Certificates help increase the potential number of entities willing to provide mortgage insurance or guarantees. Many insurance or guarantee providers limit their activities only to providing protection for types of loans that they understand well. When a mortgage originator desires to market a new type of loan, typically it will first seek confirmation that mortgage insurance and security guarantees will be available for the loan to ensure that it will be successful. For new types of loans, the expense of this insurance and guarantee coverage can be high and the availability low. Through a Guarantee Certificate, however, an issuer can offer protection on a Reference Pool that resembles the new type of loan. The issuer can search the existing universe of insured or guaranteed loans for ones that resemble the pool of loans held by the originator seeking service or for loans for which the issuer understands the relationship between the two separate loan pools such that the Guarantee Certificate can be structured to serve as effective protection for the originator. These selected loans would become the Reference Pool for a new Guarantee Certificate. The issuer has consequently priced a security based on loans that the issuer understands well, and the originator has obtained service more easily and inexpensively than it could have by negotiating a contract for the specific pool of new loans.

Third, Guarantee Certificates reduce the risk of providing mortgage insurance and guarantees by allowing the mortgage insurer or guarantor to effectively cancel its insurance or guarantee liability, if so desired. Since the instruments can be traded in a secondary market, once a secondary market is established, the issuer could buy back its own Guarantee Certificate thereby reducing or canceling its liability. If the issuer's own Guarantee Certificate were not available, it could buy a comparable Guaranty Certificate from another issuer, thereby largely mitigating its liability. This should encourage additional entities to offer mortgage insurance and security guarantees, thereby reducing the cost of both services to the ultimate consumer.

Finally, Guarantee Certificates provide a unique instrument for investors who want to invest in mortgage-related credit risk. Investors currently have access only to private-label subordinated mortgage-backed securities. These securities return coupon and principal, and can lose principal in the event of default. Because Guarantee Certificates pay only the losses associated with default, they allow a new venue for investment in mortgage-related credit risk. This characteristic of Guarantee Certificates helps ensure consistent and fair market pricing of the risk covered by Guarantee Certificates.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for administering a guarantee certificate, which is a financial instrument representing an obligation of a first party to make payments triggered by a triggering loan-default-related event involving a loan, the method comprising the steps of:
determining, using a data processing system including a computer processor, when the triggering loan-default-related event has occurred;
calculating, using the data processing system, a payment based on the determined triggering loan-default-related event; and
issuing, using the data processing system, a command to make the payment to a holder of the guarantee certificate,
the holder of the guarantee certificate being entitled to the payment due to ownership of the guarantee certificate and
not being the first party.

2. The method of claim 1, wherein the step of determining when the triggering loan-default-related event has occurred includes:
querying an information source for a current status of the loan; and
comparing, by the data processing system, the current status to the triggering loan-default-related event.

3. The method of claim 1, wherein the step of determining when the triggering loan-default-related event has occurred includes:
accepting a current status of the loan; and
comparing, by the data processing system, the current status to the triggering loan-default-related event.

4. The method of claim 1, wherein the step of calculating the payment includes:
calculating, by the data processing system, the payment as a dollar-for-dollar pass through of an amount paid by the first party.

5. The method of claim 1, wherein the step of calculating the payment includes:
calculating, by the data processing system, the payment as an amount determined by a non-pass-through formula based on a predetermined loan-default-related event trigger.

6. The method of claim 1, wherein the step of issuing the payment to a holder of the guarantee certificate includes:
issuing, by the data processing system, instructions to an agent to pay the payment to the holder of the guarantee certificate.

7. The method of claim 1, further comprising:
updating an identity of the holder of the guarantee certificate after the guarantee certificate is conveyed to a new holder.

8. The method of claim 1,
wherein the loan is an insured loan, and
wherein issuing the payment further comprises:
directing an insurance payment generated for the insured loan to the holder of the guarantee certificate.

9. The method of claim 1, wherein the holder of the guarantee certificate is entitled to the payment due to ownership of the guarantee certificate, independently of whether the holder of the guarantee certificate is entitled to cash flows derived from payments by a borrower of the loan.

10. A system for administering a guarantee certificate, which is a financial instrument representing an obligation of a first party to make payments triggered by a default-related event involving a loan, the system comprising:
a memory that holds information and instructions; and
a processor, communicatively connected to the memory, that accesses the information and the instructions to implement a process comprising:
determining when the default-related event involving the loan has occurred;
calculating a payment when it is determined that the default-related event has occurred; and
issuing a command to make the payment to a holder of the guarantee certificate,
the holder of the guarantee certificate being entitled to the payment due to ownership of the guarantee certificate and
not being the first party.

11. The system of claim 10, wherein determining when the default-related event has occurred includes:
 querying an information source for a current status of the loan; and
 comparing the current status to the default-related event.

12. The system of claim 10, wherein determining when the default-related event has occurred includes:
 receiving a current status of the loan; and
 comparing the current status to the default-related event.

13. The system of claim 10, wherein calculating the payment includes:
 calculating the payment as a dollar-for-dollar pass through of an amount paid by the first party.

14. The system of claim 10, wherein calculating the payment includes:
 calculating the payment as an amount determined by a non-pass-through formula based on a predetermined default-related event trigger.

15. The system of claim 10, wherein issuing the payment to the holder of the guarantee certificate includes:
 issuing instructions to an agent to pay the payment to the holder of the guarantee certificate.

16. A tangible computer program product comprising:
 a computer usable solid medium having computer readable code embodied therein for administering a guarantee certificate, which is a financial instrument representing an obligation of a first party to make payments triggered by a default-related event involving a loan, comprising:
 computer readable code for determining when the default-related event has occurred;
 computer readable code for calculating a payment based on the determined default-related event; and
 computer readable code for issuing a command to make the payment to a holder of the guarantee certificate,
 the holder of the guarantee certificate being entitled to the payment due to possession of the guarantee certificate and
 not being the first party.

17. The tangible computer product of claim 16 wherein the computer readable code for determining when the default-related event has occurred includes:
 computer readable code for querying an information source for a current status of the loan; and
 computer readable code for comparing the current status to the default-related event.

18. The tangible computer product of claim 16, wherein the computer readable code for determining when the default-related event has occurred includes:
 computer readable code for accepting a current status of the loan; and
 computer readable code for comparing the current status to the default-related event.

19. The tangible computer product of claim 16, wherein the computer readable code for calculating the payment includes:
 computer readable code for calculating the payment as a dollar-for-dollar pass through of an amount paid by the first party.

20. The tangible computer product of claim 16, wherein the computer readable code for calculating the payment includes:
 computer readable code for calculating the payment as an amount determined by a non-pass-through formula based on a predetermined default-related event trigger.

21. The tangible computer product of claim 16, wherein the computer readable code for issuing a command to make the payment to a holder of the guarantee certificate includes:
 computer readable code for issuing instructions to an agent to pay the payment to the holder of the guarantee certificate.

22. A method for administering a guarantee certificate, which is a financial instrument representing an obligation of a first party to make payments triggered by a triggering loan-default-related event involving a loan, the method comprising the steps of:
 determining, using a data processing system including a computer processor, when the triggering loan-default-related event has occurred;
 calculating, using the data processing system, a payment based on the determined triggering loan-default-related event, the payment being calculated as an amount determined by a non-pass-through formula; and
 issuing, using the data processing system, a command to make the payment to a holder of the guarantee certificate,
 the holder of the guarantee certificate being entitled to the payment due to ownership of the guarantee certificate and
 not being the first party.

\* \* \* \* \*